United States Patent
Shackelford (10) Patent No.: US 10,190,292 B1
(45) Date of Patent: Jan. 29, 2019

(54) RAINWATER COLLECTION SYSTEM

(71) Applicant: Brandon Thomas Shackelford, Morganton, NC (US)

(72) Inventor: Brandon Thomas Shackelford, Morganton, NC (US)

( * ) Notice: Subject to any disclaimer, the term of this patent is extended or adjusted under 35 U.S.C. 154(b) by 0 days.

(21) Appl. No.: 15/205,125

(22) Filed: Jul. 8, 2016

Related U.S. Application Data (60) Provisional application No. 62/193,119, filed on Jul. 16, 2015.

(51) Int. Cl.
*E03B 3/03* (2006.01)

(52) U.S. Cl.
CPC ....................................... *E03B 3/03* (2013.01)

(58) Field of Classification Search
CPC .............. E04H 15/04; E03B 3/02; E03B 3/28
USPC ..................................... 141/86–89; 52/11–16
See application file for complete search history.

(56) References Cited

U.S. PATENT DOCUMENTS

| | | | |
|---|---|---|---|
| 3,042,056 A * | 7/1962 | Todorovic | A45B 25/18 135/33.2 |
| 7,343,754 B2 | 3/2008 | Ritchey | |
| 8,075,765 B2 | 12/2011 | Perlatti | |
| 2007/0289667 A1 | 12/2007 | Hennessy | |
| 2009/0159137 A1* | 6/2009 | Odachowski | E04H 9/145 137/312 |
| 2011/0132823 A1 | 6/2011 | Brown | |
| 2014/0352842 A1* | 12/2014 | McEvilly | E04H 15/04 141/69 |

* cited by examiner

*Primary Examiner* — Timothy L Maust
*Assistant Examiner* — Timothy P Kelly
(74) *Attorney, Agent, or Firm* — Terry M. Sanks, Esq.; Beusse Wolter Sanks & Maire, PLLC (57) ABSTRACT

A system comprising a pliable material positioned to create a gravity feed drainage so that at least a liquid and a solid that melts into a liquid travels downward with respect to gravity to a collector pocket located on at least one of a top surface, between a top surface and a bottom surface of the pliable material and at the bottom surface of the pliable material to hold the at least liquid and solid that melts into the liquid, a plug extends from the collector pocket and opens further downward to which at least a part of an enclosable storage container is secured to a backside of the pliable material to collect the liquid.

12 Claims, 9 Drawing Sheets

RAINWATER COLLECTION SYSTEM

CROSS-REFERENCE TO RELATED APPLICATIONS

This application claims the benefit of U.S. Provisional Application No. 62/193,119 filed Jul. 16, 2015, and incorporated herein by reference in its entirety.

BACKGROUND

Embodiments relate generally to camping equipment and, in particular, to a rainwater collection system.

On camping and fishing trips, obtaining clean water for drinking and cooking can be a challenge. The same may also be true when hiking, hunting, trapping, at a beach, boating, bicycling, etc. The same may result if traveling, such as pilots who fly planes into remote areas, and survivalist who are out in nature or wilderness people. Those who work in nature also may encounter situations where there is a challenge finding clean drinking water. For example, game wardens or park rangers may encounter situations where fresh water supply is needed when away from a ranger station.

Even the most pristine looking mountain stream may not be entirely sanitary. Water purification tablets are available, but these introduce chemicals which users may not be eager to welcome into their bodies. Also, homeowners may wish to supplement the regular water supply for any one of several reasons. When the regular water supply is unavailable, due to a broken water main or some other difficulty, an emergency source at home would be very convenient. Fortunately, in any area with more than occasional rain, a ready source of clean water is available.

A rainwater collection system, which is easily set up and storable to collect any rainfall for convenient use, would resolve this problem.

SUMMARY

A system for collecting water that is produced in the atmosphere is disclosed. In an embodiment, a system comprises a pliable material arranged to provide for a liquid to flow along a top surface of the pliable material in a defined direction, a collector pocket located within a path of the defined direction to collect the liquid, a plug with a first end opening within the collector pocket and a second end terminating on a back side of the pliable material, a locking mechanism located on the back side of the pliable material, and a storage container separateable into at least a first part and a second part, wherein at least one of the first part and the second part form a container that attaches to the locking mechanism. The storage container may be considered an enclosable container or enclosable storage container.

In another embodiment, a system comprises a pliable material positioned to create a gravity feed drainage so that at least a liquid and a solid that melts into a liquid travels downward with respect to gravity to a collector pocket located on at least one of a top surface and a bottom surface of the pliable material to hold the at least liquid and solid that melts into the liquid, a plug extends from the collector pocket and opens further downward to which a part of an enclosed storage container is secured to a backside of the pliable material to collect the liquid.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 1:
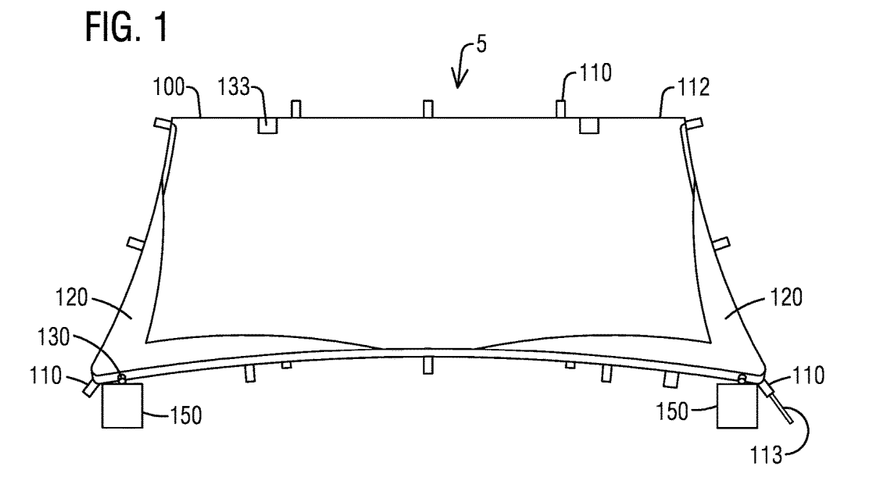
FIG. 1 shows a front view of an embodiment of a rainwater collection system.

FIG. 1 is a front view of an embodiment of a rainwater collection system. As shown in FIG. 1, a waterproof material, or tarp, 100, lifting and fastening elements 110, ridgeline 112, at least one cord 113, a collection pocket 120, a plug 130, and cups (or halves, or parts, of a storage container) 150 are shown as possible parts of the system 5. Though the term "tarp" is used herein, this term is not limited to a dictionary definition, such as a heavy-duty waterproof cloth, originally of tarred canvas. This term may pertain to any material that allows for a liquid to primarily not soak into the material. More specifically, it pertains to any material ranging from material that repels liquid to one that only partially repels liquid. The tarp 100 may be made of a flexible, or pliable, material. Non-limiting examples of the material used include nylon fabric, ripstop material and Cuban fiber. In addition to the tarp 100, the lifting and fastening elements 110, the cords 113 and the pockets 120 may be manufactured from a flexible, durable material which is substantially waterproof, such as nylon fabric. In another embodiment, the tarp 100 may be made of a non-pliable material. As a non-limiting example, the size of the tarp may be 9 square feet. An actual shape and size of the tarp is not limited as both shape and size may be determined based on how the tarp 110 is placed for collecting water. As a non-limiting example, all components are made from rust-free material.

Though rainwater and water are used herein to explain what the system 5 is used with, those skilled in the art will readily recognize that other forms of liquid and solids which may transform to a liquid may be used with the system disclosed herein. As such, the terms water and storm water may include both other liquids and solids which may transform to a liquid. As a non-limited example of a solid which may transform into a liquid, instead of rain falling, hail or snow may fall which may be collected by the system 5 where the resulting water is then usable. In another non-limiting embodiment, condensation or rain may turn to ice, if the weather is cold enough, which then later warms to turn the ice into its liquid form. Thus, in time, depending on the temperature where the system 5 is located, the hail, ice or snow will transition to liquefied water.

Fastening, pull tabs, or lifting elements 110 may be provided to arrange the tarp 100 to provide for a peak configuration to assist in directing liquid to an intended location on an outer surface of the tarp 100. A plurality of lifting elements 110 may be provided to allow for positioning the tarp 100 on a plurality of configurations. As a non-limiting example, 19 fastening elements 110 may be provided. The fastening elements 110 may be used to secure the tarp 100 to a plurality of locations such as, but not limited to, the ground, trees, poles, etc., wherein different pitch designs may be realized.

A plurality of nylon cords 117 may be provided for this purpose. As shown in FIG. 1 the tarp 100 in combination with at least one cord 117 may be positioned to create a ridgeline 118. The ends of the tarp 10 may be secured to trees or poles, such that rainwater may easily flow down either side of the tarp 10. In a non-limiting example, each cord 117 is approximately 36 inches, plus or minus 12 inches, in length and approximately 0.25 inch in diameter, plus or minus 0.25 inches. Thus, cords 117 of longer or shorter length, and greater or lesser diameter, are also contemplated.

As disclosed further below, the collection pocket 120 may have a plurality of configurations. As shown in FIG. 1, the collection pocket may be "L-shaped." In this configuration regardless of the direction the tarp 100 is turned, there is a pocket 120 available in each corner.

Figure 2:
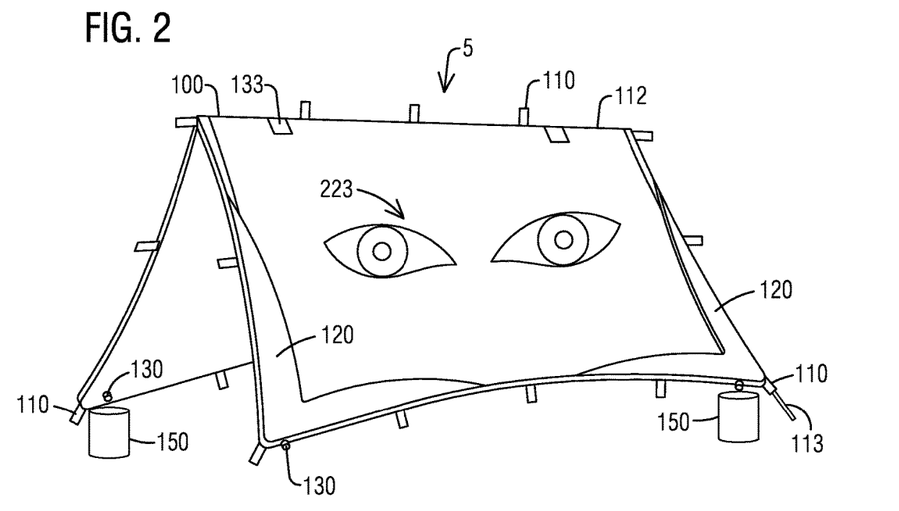
FIG. 2 shows a perspective view of the rainwater collection system.
Figure 3:
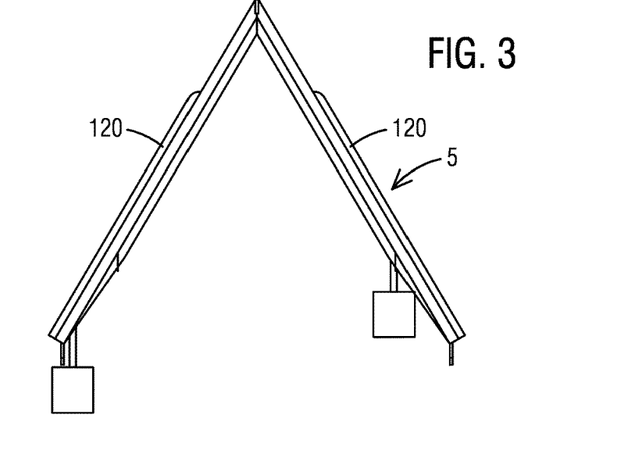
FIG. 3 shows a front view of the rainwater collection system.

FIGS. 2-13 illustrate embodiments of various configurations the tarp may be positioned to capture rainwater as well an embodiments of the tarp. FIG. 2 shows a perspective view of FIG. 1 which shows a rectangular arrangement of the tarp 100. FIG. 3 shows a front view of an embodiment of the system 5 with one part 150A of the container 150 located at a high or higher elevation when compared to a second part 150B of the container 150 located at a low or lower elevation. FIG. 3 also shows that one part of the tarp 100 where the parts are separated by the ridgeline 118 has a high elevation above the ground than the second part. Though FIGS. 2 and 3 show the ends of the configuration being open, in an embodiment, a covering or back panel, may be provided as an end wall. The same may also be true at the front end, which may also include a closable opening through which a user may enter and exit. The closable opening and/or the back panel may be provided to keep out weather elements such as, but not limited to, rain, wind, etc. In an embodiment, the top of the tarp 100, when in use, may comprise indents or other guiding devices to direct water towards the pocket 120. The indents or other guiding devices may be a part of the pocket 120, as shown in FIG. 2. Though shown as part of the pocket 120 in FIG. 2, the guiding device or guide line, or water ridgeline may be formed within the tarp 100 to direct water towards the pocket 120 such as, but not limited to, ridges on a surface of the tarp 100.

Figure 4:
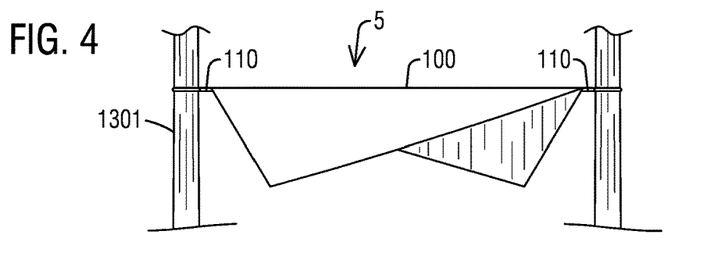
FIG. 4 shows another embodiment of the rainwater collection system.
Figure 5:
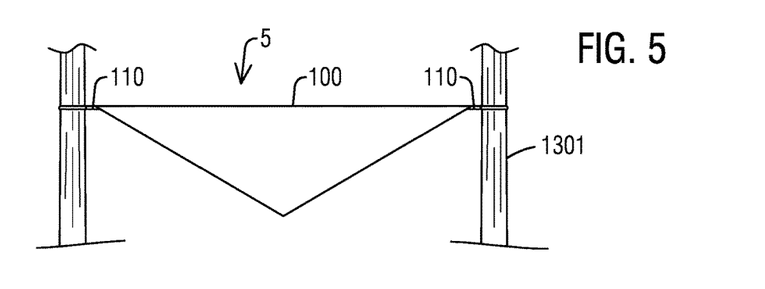
FIG. 5 shows another embodiment of the rainwater collection system.
Figure 6:
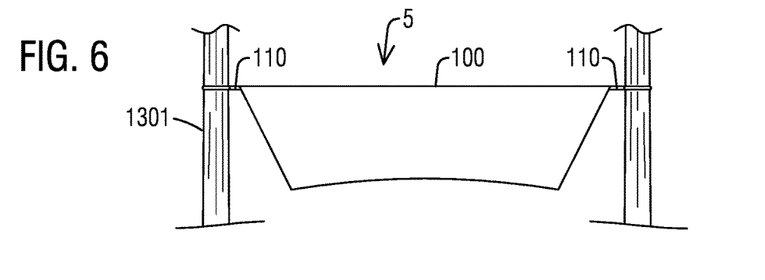
FIG. 6 shows another embodiment of the rainwater collection system.
Figure 7:
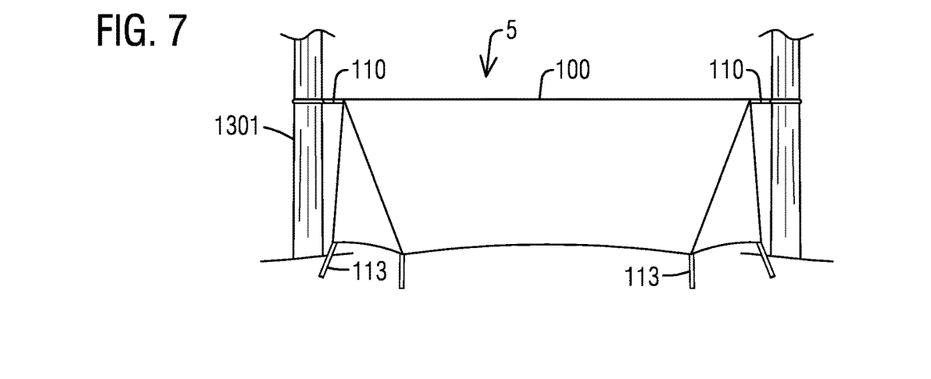
FIG. 7 shows another embodiment of the rainwater collection system.
Figure 8:
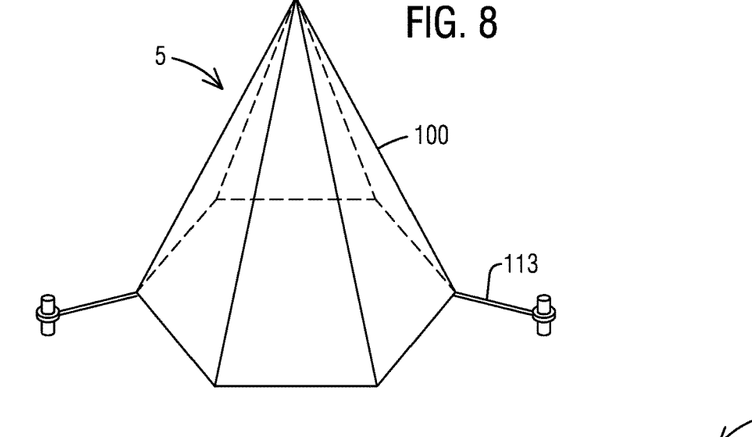
FIG. 8 shows another embodiment of the rainwater collection system.
Figure 9:
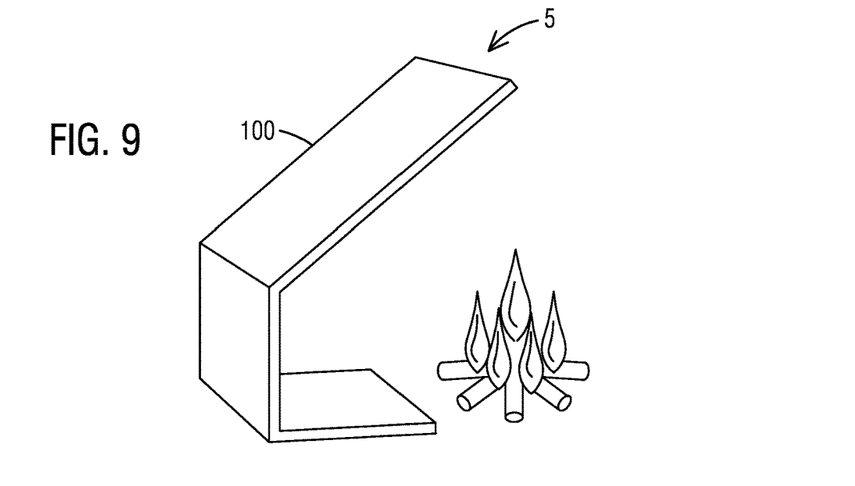
FIG. 9 shows another embodiment of the rainwater collection system.
Figure 10:
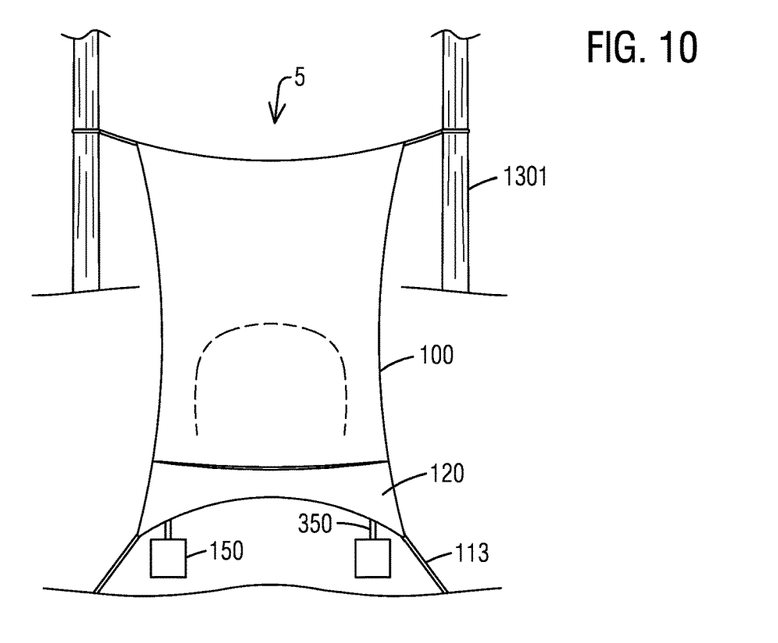
FIG. 10 shows another embodiment of the rainwater collection system.
Figure 11:
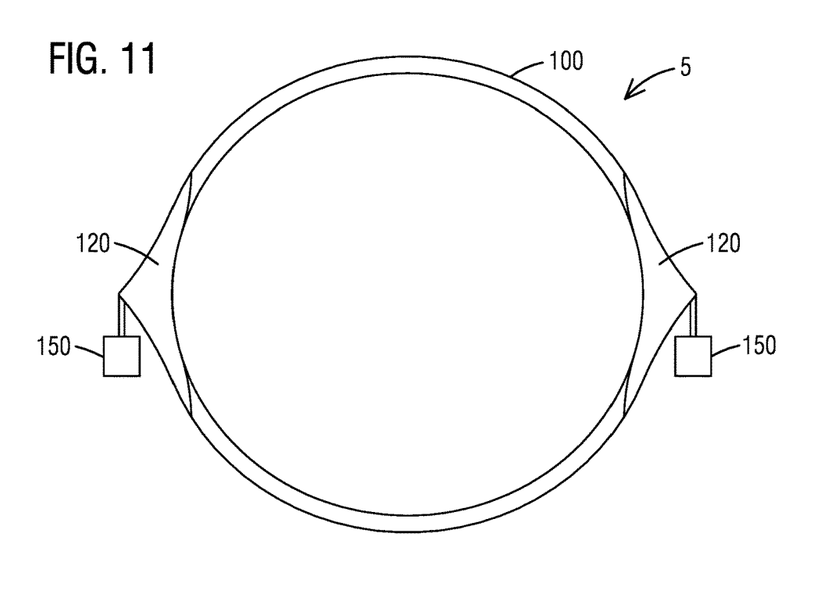
FIG. 11 shows another embodiment of the rainwater collection system.
Figure 12:
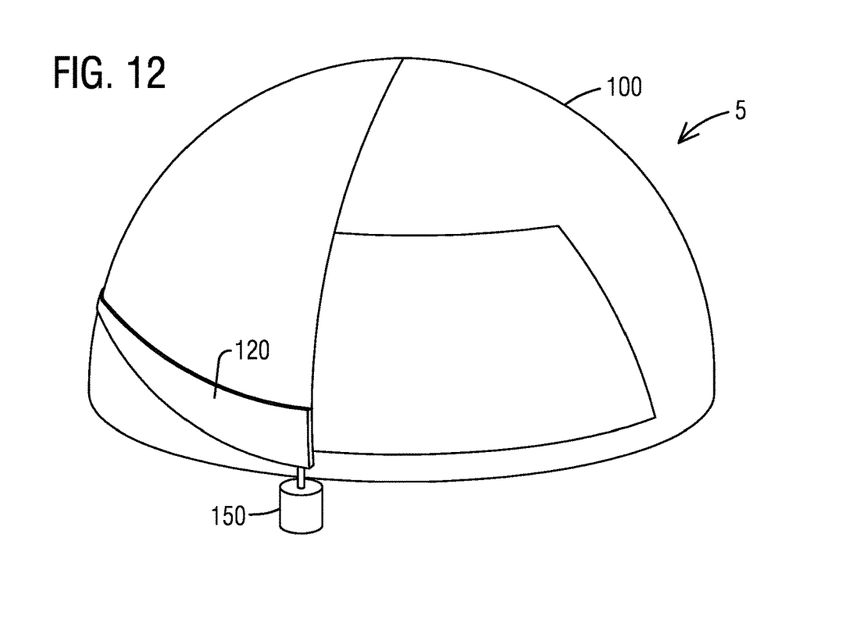
FIG. 12 shows another embodiment of the rainwater collection system.
Figure 13:
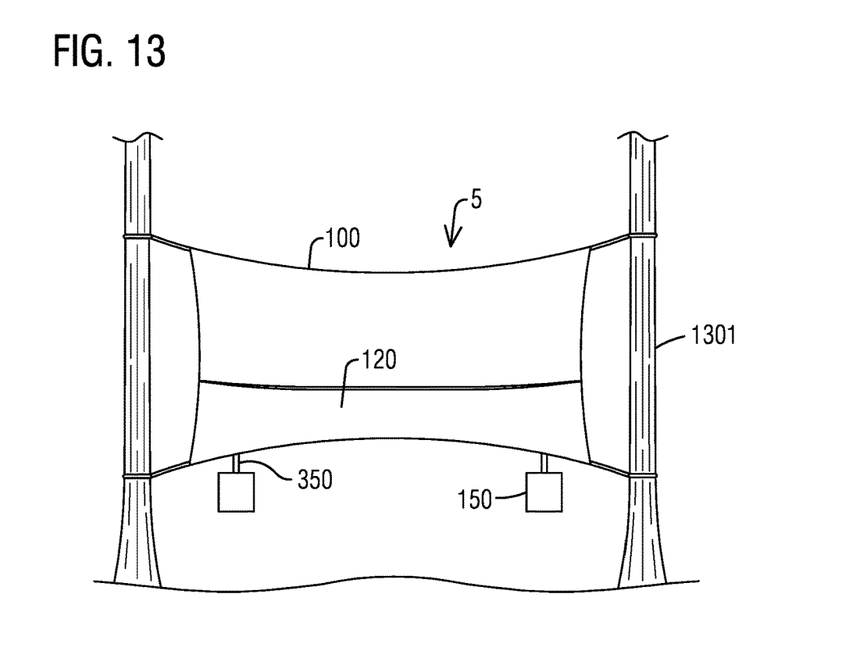
FIG. 13 shows another embodiment of the rainwater collection system.

FIG. 4 shows a side view of an embodiment of the system where the tarp is arranged in an asymmetric configuration. FIG. 5 shows a side view of an embodiment of the system where the tarp is arranged in a diamond configuration. FIG. 6 shows a side view of an embodiment of the system where the tarp is arranged in a hex or cat-cut configuration. FIG. 7 shows a side view of an embodiment of the system where the tarp is arranged in a winter configuration. FIG. 8 shows a side view of an embodiment of the system where the tarp is arranged in a Tee-Pee configuration. FIG. 9 shows a side view of an embodiment of the system Where the tarp is arranged in a canopy configuration. FIG. 10 shows a side view of an embodiment of the system where the tarp is arranged in a hammock configuration. FIG. 11 shows a top view of an embodiment of the system where the tarp is arranged in a circular configuration such as, but not limited to, being laid over a bush, or as part of an umbrella. FIG. 12 shows a perspective view of an embodiment of the system where the tarp is a part of a tent. FIG. 13 shows a side view of an embodiment of the system where the tarp is arranged as in a wind breaker configuration. As is clearly illustrated by these pluralities of configurations, how the system 5 disclosed herein is used is not limited to a particular configuration.

Figure 14:
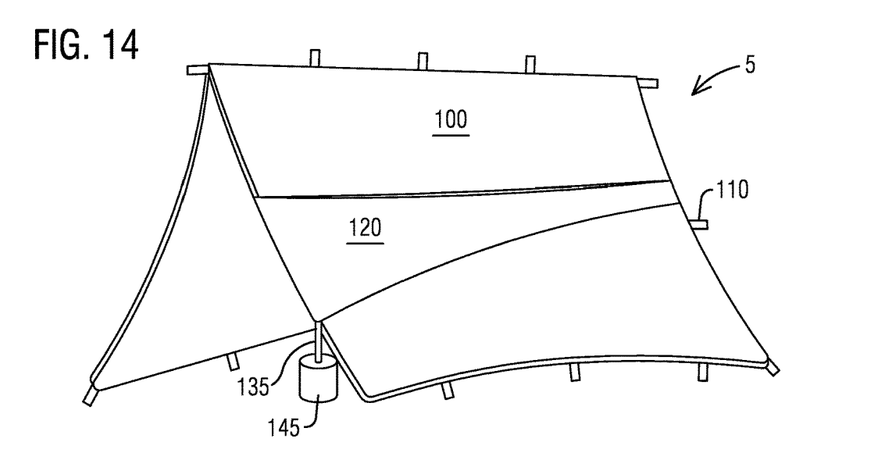
FIG. 14 shows another embodiment of the rainwater collection system.

In embodiments disclosed above, when all the tarp 100 comprises the collection pockets 120 at each corner, when each collection pocket 120 is retaining water, the tarp 100 may be further stabilized especially during a storm or high winds. Though the pockets 120 are shown as being at the corner, in other embodiments, a pocket 120 may exist at another location on the tarps. As a non-limiting example, as shown in FIG. 14, the pocket 120 is shown as being on a side of the tarp 100.

Each embodiment may also comprise pull tabs 135 (shown in FIG. 1) or clips to which an object may be attached such as, but not limited to, a flashlight, a bug net, a mesh netting, etc. In each of the embodiments above, the tarp 100 may be positioned above the ground and storage bags or pouches may be attached to the inner side of the tarp. The pouches may be waterproof so that objects placed within are further protected from weather elements, and keeping the tarp off of the ground also protects the embodiments from the weather elements that have caused the ground to take on a different formation. As a non-limiting example, if rain water has turned the ground into mud, elevating the embodiments reduces the mud impacting any of the embodiments disclosed. The ridgeline 112 may also comprise ventilation openings 133 to allow for smoke to escape while still prohibiting rain from entering.

Figure 15:
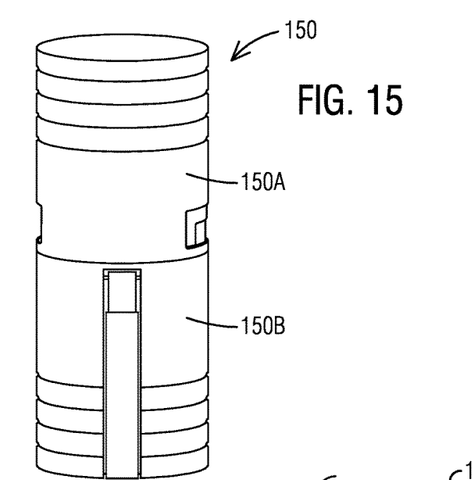
FIG. 15 shows an embodiment of the storage cylinder connected.
Figure 16:
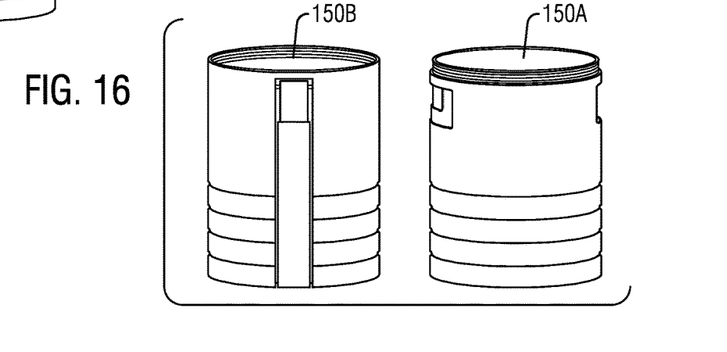
FIG. 16 shows an embodiment of the storage cylinder separated.

FIG. 15 is a side view of an embodiment of a storage container and FIG. 16 shows a side view of the storage container separated into two parts. Thus, when the container 145 is separated into two or parts, an upper, or first, cup 150A and a lower, or second, cup 150B are provided. Though the container 145 is shown as having a circular shape when viewed from either a top view or bottom view, the container may be provided in other shapes when viewed from the top view or bottom view such as, but not limited to, having an oval shape, rectangular, triangular shape, pentagonal shape, hexagonal shape, the upper cup comprising a first shape and the lower cup comprising a second shape, etc. Thus, it is evident that a shape of the container is not limited simply to the cylindrical shape shown in FIGS. 15 and 16. Additionally, though FIG. 16 shows the parts appearing to be equal in height, the two parts 150A, 150B may separate where one part is deeper (or has a taller height) than the second part.

The parts 150A, 150B may be connected together when forming the container by any one of a plurality of fastening mechanisms. Non-limiting examples include at least one latch, threaded engagement inner surfaces (such as, but not limited to, the upper cup 150A having male threads around its edge, while the lower cup 15B has corresponding female threads on its edge), a recess and indent that connect, etc.

Figure 17:
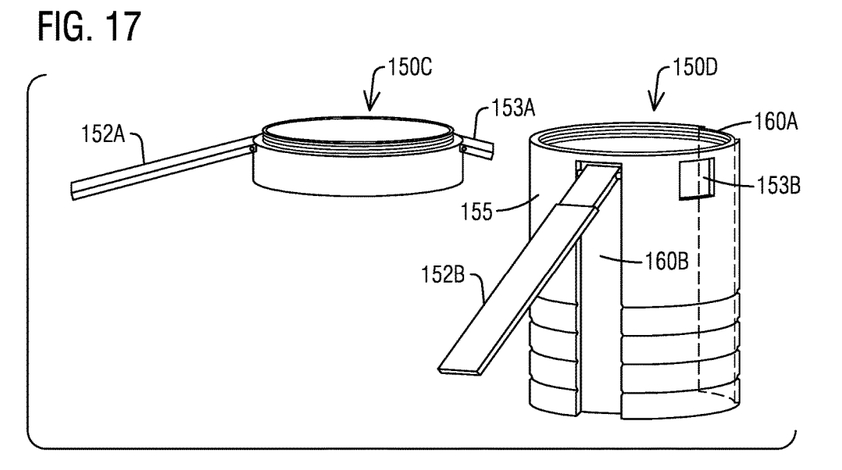
FIG. 17 shows an embodiment of the cylinder used as a cooking device.

As a non-limiting example, the parts 150A, 150B of the container 145, when separated, may form a skillet 150C with a first half and a deeper pot 150D with a second half, as illustrated in FIG. 17. The handle for each cooking apparatus may be foldable either against a side of the container 155 or into a recess 160A, 160B within a side of the container (when the two parts 150A, 150B form the container 145). As shown, when the handles 152A, 152B are stored into a recess 160A, 160B, a first recess 160B is located on the pot part 150D to receive the handle 152B of the pot 150D and a second recess 160A is also located on the pot part 150 to receive the handle 152 of the skillet 150C. Though only a single handle is shown on each part, a plurality of handles may be used on each half wherein the features disclosed above with respect to a singular handle may be applied when a plurality of handles are provided. Furthermore, the lengths of the handles 152A, 152B are non-limiting, meaning either long or short handles may be used. Thus, when a plurality of handles are provided on a particular part, the particular part may comprise both at least one long handle 152A, 152B and at least one short handle 153A, 153B.

In another embodiment, the container 145 may sit on the ground where a fire can be created within it so that cooking may occur on top of the container. Thus, a top surface of the container 145 may have a rack-like configuration. The side 155 of the container may comprise at least one hole for ventilation. In another embodiment, a utensil such as, but not limited to, a fork, spoon, knife, etc., may be located underneath the handle 152B, such as within the opening 160B that receives the handle 152B. In another embodiment, two lids may be provided, one for each part of the container. A handle may be a part of the lid as well. The lids may be attached together by having a female receiving thread at the bottom and a male thread at the top of one of the lids and then a thread that engages an opposite thread on either the top or bottom of the container.

The parts 150A, 150B may be made of a plurality of different material. As suggested above, the parts 150A, 150B may be made of a lightweight metal that may be used for cooking purposes. In another non-limiting example, the parts 150A, 150B may be made of a plastic or ceramic material, which may or may not withstand heating. As another non-limiting example, the storage container 140 may be manufactured from a rigid, durable material which is corrosion resistant, such as stainless steel or aluminum alloy. As another non-limiting example, one half may be made of a first material and the second half of a second material.

Figure 18:
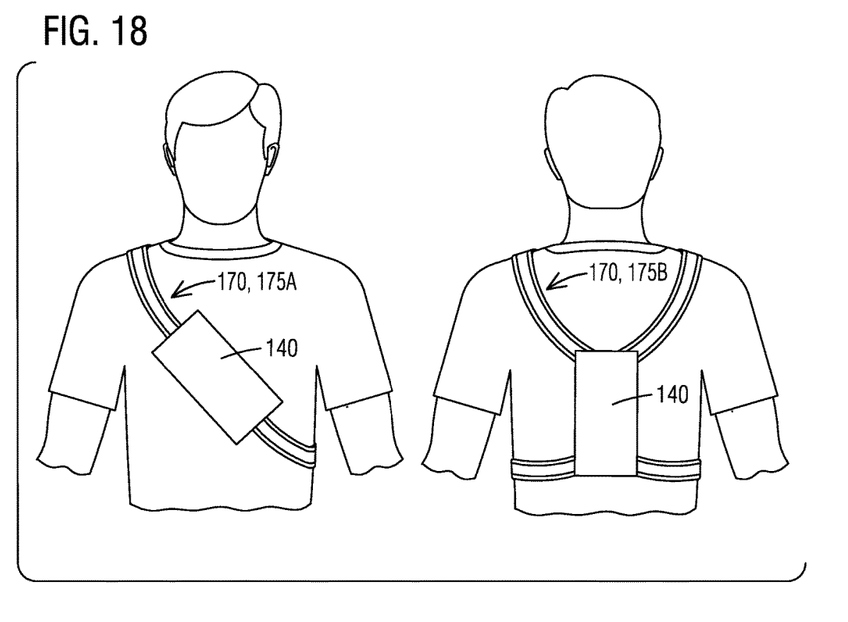
FIG. 18 shows an embodiment of the system being carried.

FIG. 18 shows an embodiment of the system being carried. To assist in transporting the system 5, material forming a carrying device 170 may be part of or attachable to the container. As a non-limiting example, the carrying device 170 may provide carrying the container 145 in a sling configuration 175A or a backpack configuration 175B. Using either configuration, the user may carry the container 145 either against the user's back or chest.

Figure 19A:
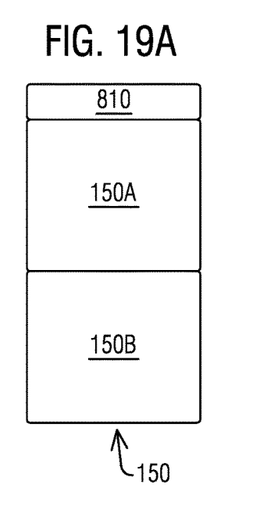
FIGS. 19A-19C show other embodiments of the container.
Figure 19B:
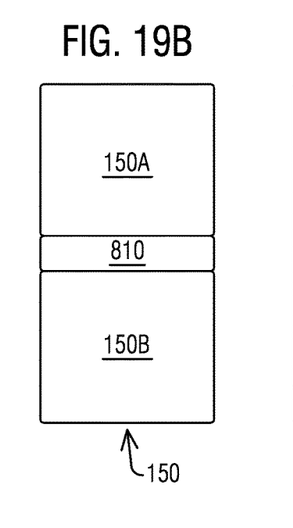
Figure 19C:
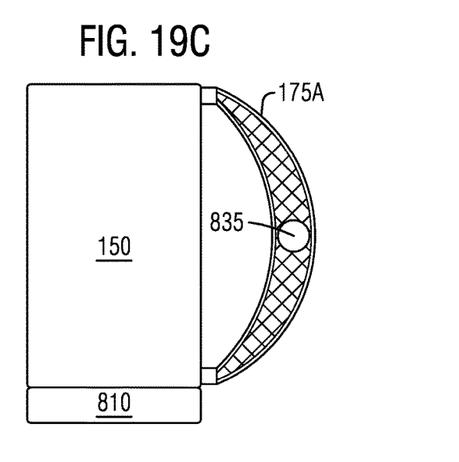

FIGS. 19A-19C show other embodiments of the container. In addition to being in two parts, the container 150 may have a lid 810, which may be a third part of the container. The lid 810 may be provided to cover a top of at least one part of the container 150A, 150B when separated. Though a single lid is shown, two lids may be provided. In another embodiment, the lid 810 is the second of two parts of the container 150. Thus, only a single part is provided to collect water whereas the second part is provided as a cover.

As a non-limiting example, the sling configuration 175A may be a survival strap/sling which comprises a compartment 835 to hold additional items needed for a particular purpose such as, but not limited to, a fire starter, tender bundle, cotton balls, signal mirror, whistle, fishing line, hooks, sinkers, floats, water purify pills, compass, foil, knife, multi-rod, razor blades, cutting blade, safety pin, sewing needle, alcohol pates, snare wire, fish gillnet, etc. In another embodiment, a backpack design may be employed in which straps extend from the container 145 to allow for a strap to be placed around each shoulder.

At least one collection pocket 120 is a part of the tarp 100, along a surface, or top side 103 of the tarp 100. In an embodiment, the collection pocket 120 may be on a bottom surface, or bottom side, 105 of the tarp 100. As explained below, instead of the collection pocket 120 being on the bottom side 105 of the tarp, a storage pocket 620 is located on the bottom side.

As a non-limiting example, the collection pocket 120 may have an L-shape, as shown at least in FIG. 1, and may be located at a corner of the tarp 100. Though shown as being located at a corner of the tarp 100, the collection pocket 120 may be located at other locations on the tarp. As a non-limiting example, turning to FIG. 3, the pocket is located further on the tarp, above, or away from the corner of the tarp 100.

Each collection pocket 120 has an aperture with a plug 130 which may be used to control the flow of water through the plug, so the user may either continue to store the water in the collection pocket 120 or funnel it into a cup 150 discussed in further detail below. In a non-limiting example, the plug 130 is located at a bottom of the collection pocket 120. This placement ensures that a pool of water does not remain in the collection pocket if all water is drained through the plug 130. More specifically, since the system 5 is based on being a gravity fed system, locating the plug 130 at the lowest point in the collection pocket 120 provides a highest chance of removing all water from the pocket.

As shown at least in FIG. 10, a tube 350 may be connected to the plug. The tube may be used to direct a flow of water from the pocket 120 to a particular direction such as, but not limited to, a container, a user's mouth, etc. The tube may comprise a shut off valve to close off the tube to prevent water from being released. When tubes are utilized, a securing device such as, but not limited to, a pull tab, may be provided to secure the tube from simply hanging from the plug.

Figure 20:
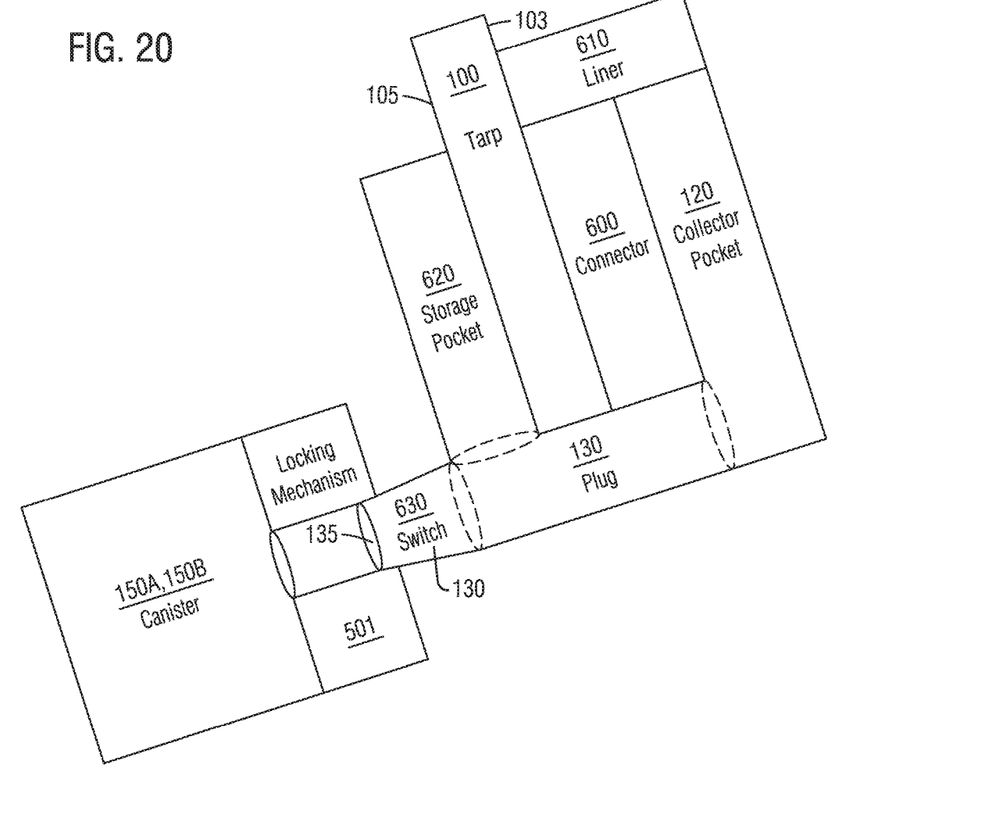
FIG. 20 shows an embodiment of a block diagram showing parts of the system.

FIG. 20 shows an embodiment of a block diagram showing parts of the system. The block diagram is shown at an angle to represent that this representation is on a declined slope. The angle of the slope may be varied based on the placement of the tarp 100. A collection pocket 120 may be easily affixed to and detached from the top side 103 of the tarp 100 itself, by a connector 600 such as, but not limited to, being connected with a. Velcro® system. Each collection pocket 120 may also provide a removable cover 610 such as, but not limited to, a fine mesh liner, which can be used to keep out leaves, seeds, and other debris during the collection process. Optionally, as discussed above, the storage pocket 620 may be provided on the bottom surface, backside or underside 105 of the tarp 100. Though not shown, the storage pocket 620 may be attached and removed from the backside 105 of the tarp 100 by way of a connector 600. Furthermore, the storage pocket 620 may have a same or different shape than the collector, or collection, pocket 120.

The plug 130 allows for water to pass from the collector pocket out to the canister 150A, 150B when connected to a locking mechanism 501. Though not shown, a tube 350 may be provided to direct liquid from the plug 130. When the storage pocket 620 is included, the plug 130 allows for water to pass from the collector pocket 120 to the storage pocket 620.

In an embodiment, the mesh liner 610 may be made of a recognizable safety color, such as orange or yellow which when removed can be used to signal for help, such as by tying it to a branch or bush for an individual passing by can see. A color of the mesh liner or even the tarp 100 is not limited and can be of a color suitable for an intended purpose. As a non-limiting example, if the user is hunting, the tarp 100 may be a camouflage color. In another non-limiting example, the tarp 100 may have a design on it such as, but not limited to, an eye or a pair of eyes 223, as illustrated in FIG. 2, which may assist in scaring off wild animals. Though not shown, small pockets may be located on the inside of the tarp to attach an object such as, but not limited to, glow sticks. The small pockets may be located behind the eyes 223 and provide for illumination that extends through the eyes 223 when the eyes are made of a material that allows for illumination therethrough (and the inner side of the tarp also allows for illumination from within the tarp to the outside). Those skilled in the art will readily recognize that the small pockets may also be provided on an outer surface of the tarp 100, behind where the eyes 223 may be attachable such as, but not limited to, with Velcro®.

The plug 130 is provided which extends from the collection pocket 120 down to the locking mechanism 501. The plug 130 may comprise a switch that opens and closes a portal 135. When open, water may flow out of the plug 130 that terminates at the locking mechanism 501. When the portal is closed, water remains held in the storage pocket 620, collector pocket 120, or both. The plug 13 may be made of a plurality of materials. As a non-limiting example, the plug is manufactured from a flexible, durable material such as rubber or silicone. The plug 130 may also engage the storage pocket 620 at its lowest or bottom location, similar to Where the plug 130 engages the collector pocket 120, for the same reasons stated above.

Figure 21:
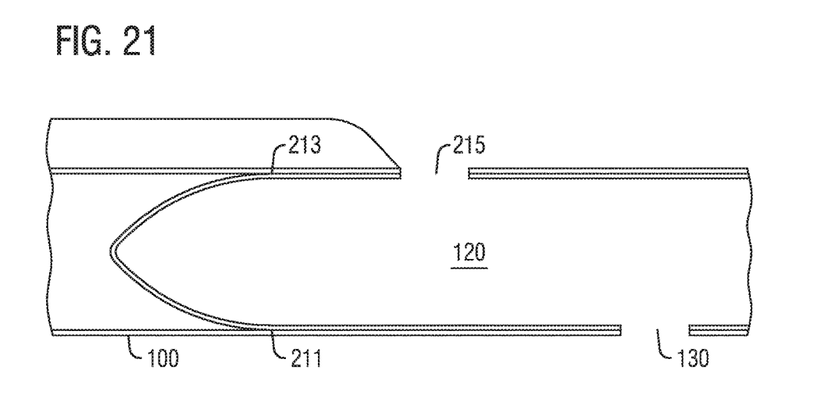
FIG. 21 shows an embodiment of the pocket within the tarp.

The pockets 120 may be located on a front side, backside, or within the tarp 100. FIG. 21 shows an embodiment of the pocket within the tarp. When within the tarp 100, the tarp 100 may be at least a two-ply material 211, 213 which is separated to form the pocket 120. The plug 130 would then be available on the underside of the tarp to allow for release of captured water. A slit or opening 215 may be available on the front side of the tarp through which water may pass. As discussed above, a guiding device may be on the top of the tarp 100 to direct water towards the opening.

Figure 22:
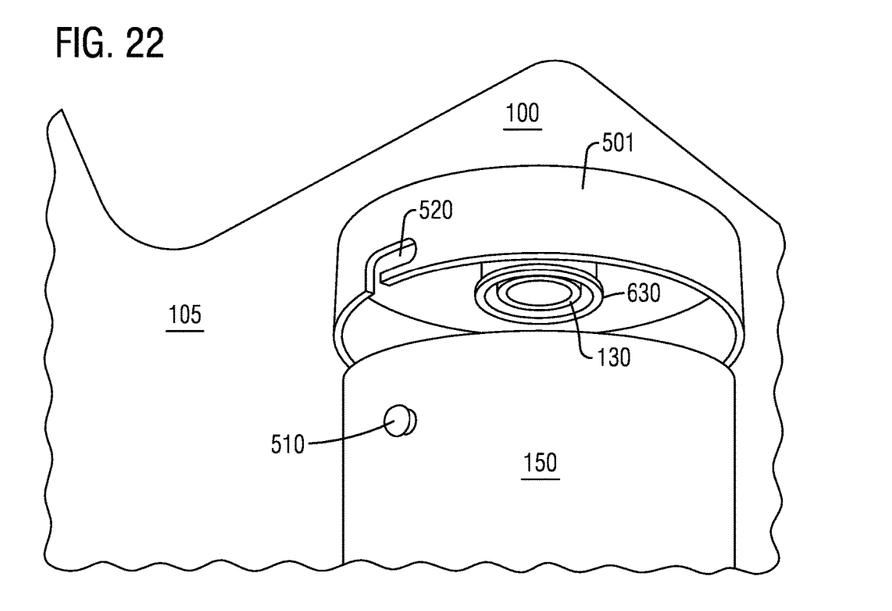
FIG. 22 shows an embodiment of the locking mechanism to secure a part of the container for collecting liquid.

FIG. 22 shows an embodiment of the locking mechanism to secure a part of the container for collecting liquid. As shown, the plug 130 is surrounded by the locking mechanism 501. A part of the container 150 has an extended element 510 that engages a track 520 within a side of the locking mechanism 501 to lock and unlock the part 150 of the container 145 from the locking mechanism 501. As discussed above, the part 150 of the canister may be locked to the locking mechanism 501 either while the system 5 is collecting liquid or once liquid is held within the collection pocket 130.

The switch 630 may be located outside of the locking mechanism 501 so that the user may control a flow of water into the part of the container 150A, 150B connected to the locking mechanism 501. In another embodiment, the switch 630 and portal 135 are not provided.

In operation, the container 150 may be separated into two parts 150A and 150B, from which the tarp 100, which may be folded and rolled compactly for storage within the container, and cords are removed. The user may secure one fastening element 110 at each end of the ridgeline 112 to a tree, pole, or another support 1301 (as shown at least in in FIG. 13 though this is shown in other embodiments as well). The type of pole is non-limiting. As a non-limiting example, if the user is canoeing, the pole may be an oar. The user may then secure the fastening elements 110 at the corners of the tarp 100 to tent pins, tree roots, or other stationary objects which are at or near ground level, using the cords 11B which are provided, The user may then insert the liners into the collection pockets 120, and insert the plugs 130 into the apertures.

Finally, the user may elect to secure a part of the container 150A, 150B at one or more of the corners of the tarp 100, such that if the plug 130 is removed, water will drain from the aperture into the cup 150A, 150B.

The embodiments disclosed herein may also be a part of any piece of material such as, but not limited to, tents, hammocks, wind blockers, etc. The embodiments disclosed herein may actually assist in saving a life. The embodiments disclosed herein are also lightweight, making it easier for the user to handle, carry, and/or assemble the system disclosed herein.

In an embodiment, a preexisting tarp may already exist. By preexisting, the tarp may be one in which the embodiments disclosed herein are not included when a user purchases or acquires the tarp initially. The other components disclosed herein may be provided as a kit which can transform the tarp into an embodiment disclosed herein. Connectors such as, but not limited to, Velcro® may be used to attached the collector pocket 120 to the tarp 100. The plug 130 may be configured with a pointed, penetrable or jagged edge that may penetrate the tarp 100 when pressed against the tarp 100. In another embodiment, an alarm system may be a part of the embodiments disclosed. As a non-limiting example, a fish line with two cans may be attached to one of the embodiments so that if a wild animal comes into contact with one of the embodiments, the cans will knock together. In another embodiment, the cans are located proximate to each container part 150A, 150B so that when an animal comes into contact, the can will make contact with the container part, causing a loud enough sound to get the user's attention.

In another embodiment, the tarp may comprise at least one area such as, but not limited to, an opening, a window, and the like, through which the user can view the other side of the tarp. A clear material may be applied over the area. As a non-limiting example, the window may assist an injured user, which limited mobility, to signal from within the tarp to a potential rescuer. The window may be located where the eyes are located in FIG. 2 or the eyes 223 may form a part of the window.

Components, component sizes, and materials listed above are preferable, but artisans will recognize that alternate components and materials could be selected without altering the scope of the invention.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed is:

1. A system comprising:
a pliable waterproof material;
a collector pocket on the pliable waterproof material with an opening to receive at least one of a liquid and a solid that melts into a liquid;
a storage container separable into a first part and a second part with at least one of the first part and the second part further comprising a handle retractable within the at least one of the first part and the second part to provide the at least one of the first part and the second part to function as a cooking apparatus; and
a plug that extends from the collector pocket and opens further downward to which at least one of the first part and the second part of the storage container is secured to a backside of the pliable material to collect the liquid,
wherein the pliable material is positioned to create a gravity feed drainage so that at least the liquid and the solid that melts into the liquid travels downward with respect to gravity to the collector pocket located on at least one of a top surface and formed between a top surface and a bottom surface of the pliable material and, when formed between a separation of the top surface and the bottom surface of the pliable material, the collector pocket having the opening between the top surface and the bottom surface into which the at least liquid and solid travel to hold the at least liquid and solid that melts into the liquid.

2. The system according to claim 1, further comprising a locking mechanism attached to the backside of the pliable material to secure the at least one of the first part and the second part of the storage container.

3. The system according to claim 1, wherein the storage container, when arranged as an enclosed arrangement holds the pliable material within the enclosable storage container.

4. The system according to claim 1, wherein when the collector pocket is located on the top surface of the pliable material, a storage pocket is located on at least one of the bottom surface and between the top surface and the bottom surface of the pliable material with the plug providing passage of liquid from the collector pocket to travel to the storage pocket.

5. The system according to claim 1, wherein the plug further comprises a portal and a switch to control the portal to an opened and a closed position.

6. The system according to claim 1, further comprising at least one support to hold a first part of the pliable material above a second part of the pliable material to create a downward slope.

7. The system according to claim 6, wherein the collector pocket is located on the second part of the pliable material.

8. The system according to claim 1, further comprising a cover over the collector pocket to allow liquid to pass, but to prevent debris from passing into the collector pocket.

9. The system according to claim 1, further comprising a tube connected to the plug to direct a flow of liquid from the plug.

10. A system comprising:
a pliable waterproof material;
a collector pocket formed on a side of the pliable waterproof material with an opening to receive at least one of a liquid and a solid that melts into a liquid;
a storage container separable into a first part and a second part with at least one of the first part and the second part further comprising a handle retractable within the at least one of the first part and the second part to provide the at least one of the first part and the second part to function as a cooking apparatus; and
a plug that extends from the collector pocket and opens further downward to which at least a part of the storage container is secured to a backside of the pliable material to collect the liquid,
wherein the pliable material is positioned to create a gravity feed drainage so that at least one of the liquid and the solid that melts into a liquid travels downward with respect to gravity to the collector pocket located on at least one of a top surface and formed between a top surface and a bottom surface of the pliable material and, when formed between the top surface and the bottom surface of the pliable material, the collector pocket having the opening between the top surface and the bottom surface into which the at least liquid and solid travel to hold the at least liquid and solid that melts into the liquid, with, except for the opening, the top surface covers a bottom surface of the collector pocket.

11. The system according to claim 1, wherein the storage container further comprises a third part that functions as a lid to cover at least one of the first part and a second part of the storage container.

12. The system according to claim 2, wherein the locking mechanism comprises a part arranged to surround and end of the plug that extends from the collector pocket and opens further downward and a track within the part of the locking mechanism that surrounds the end of the plug and wherein the at least one of the first part and the second part of the container comprises an extended element that engages the track of the locking mechanism when the at least one of first part and the second part of the container is attached to the plug.

* * * * *